United States Patent [19]
Antonini

[11] 3,876,034
[45] Apr. 8, 1975

[54] SOUNDPROOF PANEL

[75] Inventor: Francesco Antonini, Pornichet, France

[73] Assignee: Societe Nationale Industrielle Aerospatiale, Paris (Seine), France

[22] Filed: Jan. 28, 1974

[21] Appl. No.: 436,879

[30] Foreign Application Priority Data
Feb. 7, 1973 France .............................. 73.04258
Jan. 8, 1974 France .............................. 74.00524

[52] U.S. Cl. ............................... 181/33 G; 181/33 A
[51] Int. Cl. .............................................. E04b 1/84
[58] Field of Search ........... 181/33 G, 33 K, 33 GB, 181/33 GA; 161/160

[56] References Cited
UNITED STATES PATENTS

| | | | |
|---|---|---|---|
| 3,160,549 | 12/1964 | Caldwell et al. ............ | 181/33 G UX |
| 3,161,258 | 12/1964 | Chapman ................ | 181/33 G B UX |
| 3,231,042 | 1/1966 | Chapman ................... | 181/33 G UX |
| 3,243,374 | 3/1966 | Gillard ....................... | 181/33 G UX |
| 3,319,738 | 5/1967 | Wehe ......................... | 181/33 G UX |
| 3,534,828 | 10/1970 | Iver et al. ............................ | 181/33 K |
| 3,540,547 | 11/1970 | Coward ....................... | 181/33 G UX |
| 3,648,828 | 3/1972 | McCaffrey et al. ......... | 181/33 K UX |
| 3,747,735 | 7/1973 | Frick ........................... | 181/33 K UX |
| 3,773,140 | 11/1973 | Mahajan et al. .................. | 181/33 K |

Primary Examiner—Richard B. Wilkinson
Assistant Examiner—John F. Gonzales
Attorney, Agent, or Firm—Murray Schaffer

[57] ABSTRACT

The invention relates to the soundproofing of structures in general.

It relates to a soundproofing panel adapted to be applied against the structure to be soundproofed and consisting of a sheet of lead coated with a flexible and elastic material enabling it to closely hug the structure in question.

The invention is applicable in particular to riveting shops.

7 Claims, 5 Drawing Figures

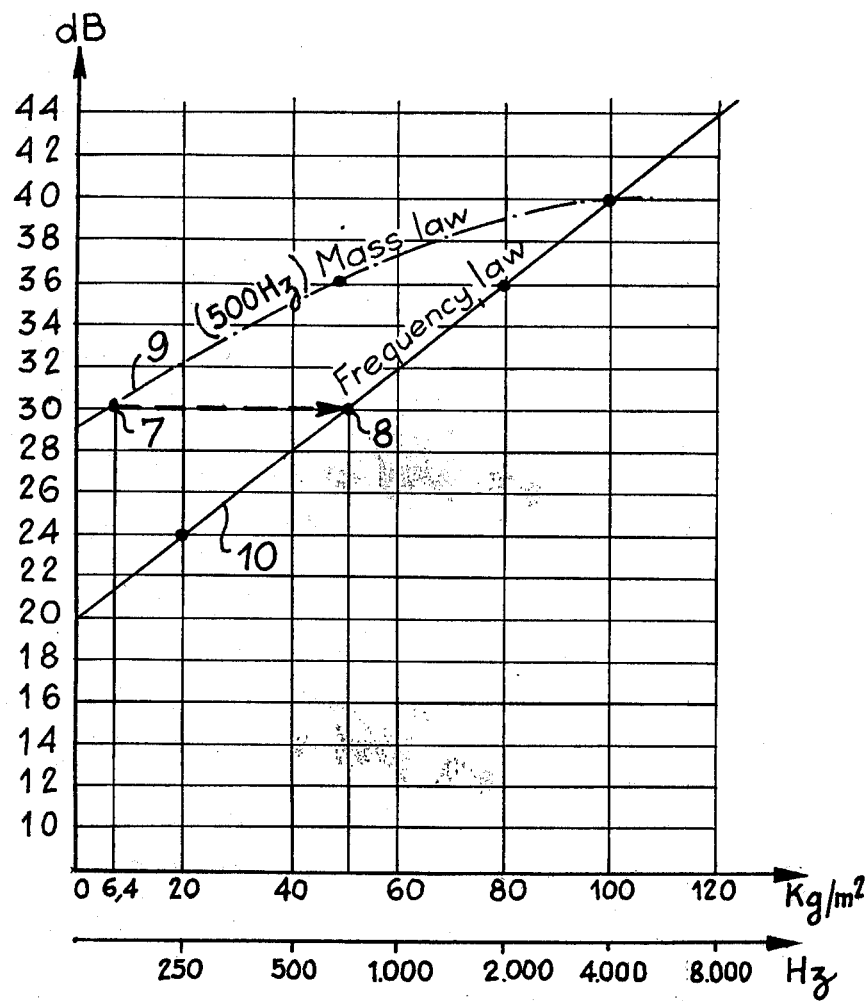
Fig. 3.
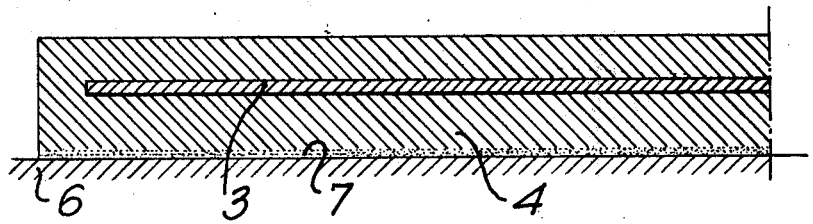
Fig. 4.
Fig. 5
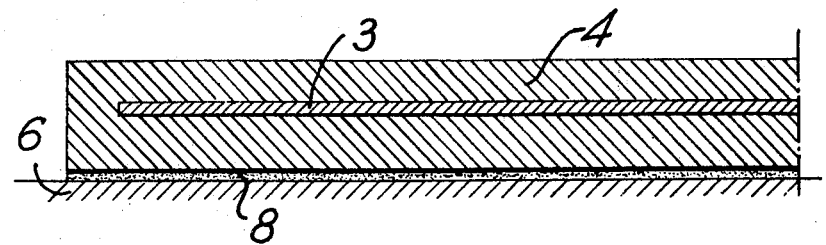

SOUNDPROOF PANEL

It is the object of the present invention to attenuate the noise emitted by any kind of noise-generating source, but most notably by riveting shops.

The noise level in a workshop for riveting of all kinds, particularly aircraft structural components, is so high that special precautions have to be taken to protect he riveters and usually consist in the wearing of a special helmet. However, although the more exposed riveting stations can be protected locally, it is virtually impossible to completely soundproof the whole workshop, as a result of which even workshop personnel at a distance from loud sources of noise may be inconvenienced by the noisy environment of riveting areas.

Regulations relating to noisy environments have in fact been formulated and have resulted in Dr. Wissner's curves, to which further reference will be made hereinafter.

The applicant has noted that by applying a sheet of lead against noisy metal structures it is possible to considerably attenuate the noise, provided that there is intimate direct or indirect contact with the structure. It is accordingly a teaching of this invention that the sheet of lead is coated with a flexible and elastic material capable of causing the structure to be closely hugged by the panel, such material being possibly an elastomer or other plastic. The sheet of lead, which may be curved to enable it to generally follow the surface of the structure in question, can thus be made to closely hug the details thereof through the agency of the plastic coating.

The bond between the panel and the structure can be obtained by adhesion in order to enable all structures, metallic or non-metallic, to benefit from the subject soundproofing means of this invention.

Alternatively, magnetic uniting means may be provided between the soundproofing panel and the structure to be soundproofed in cases where the latter is made of metal.

In one form of embodiment, magnetic particles, in ferrite or like powder form, are dispersed through the panel coating substance immediately proximate the panel-structure contact face and a magnetization force is generated whereby to create magnetic fields that cause intimate application of said panel against said metallic structure.

In an alternative form of embodiment, a flexible magnetic panel is applied by adhesion against the soundproofing panel whereby to form a new soundproofing panel capable of being applied magnetically against any metallic structure.

The description which follows with reference to the accompanying non-limitative exemplary drawing will give a clear understanding of how the invention can be carried into practice.

In the drawing:

FIG. 3 shows graphs of noise attenuation plotted against weight of the lead sheet, and FIGS. 4 and 5 are alternative sectional views corresponding to FIG. 2.

Figure 1:
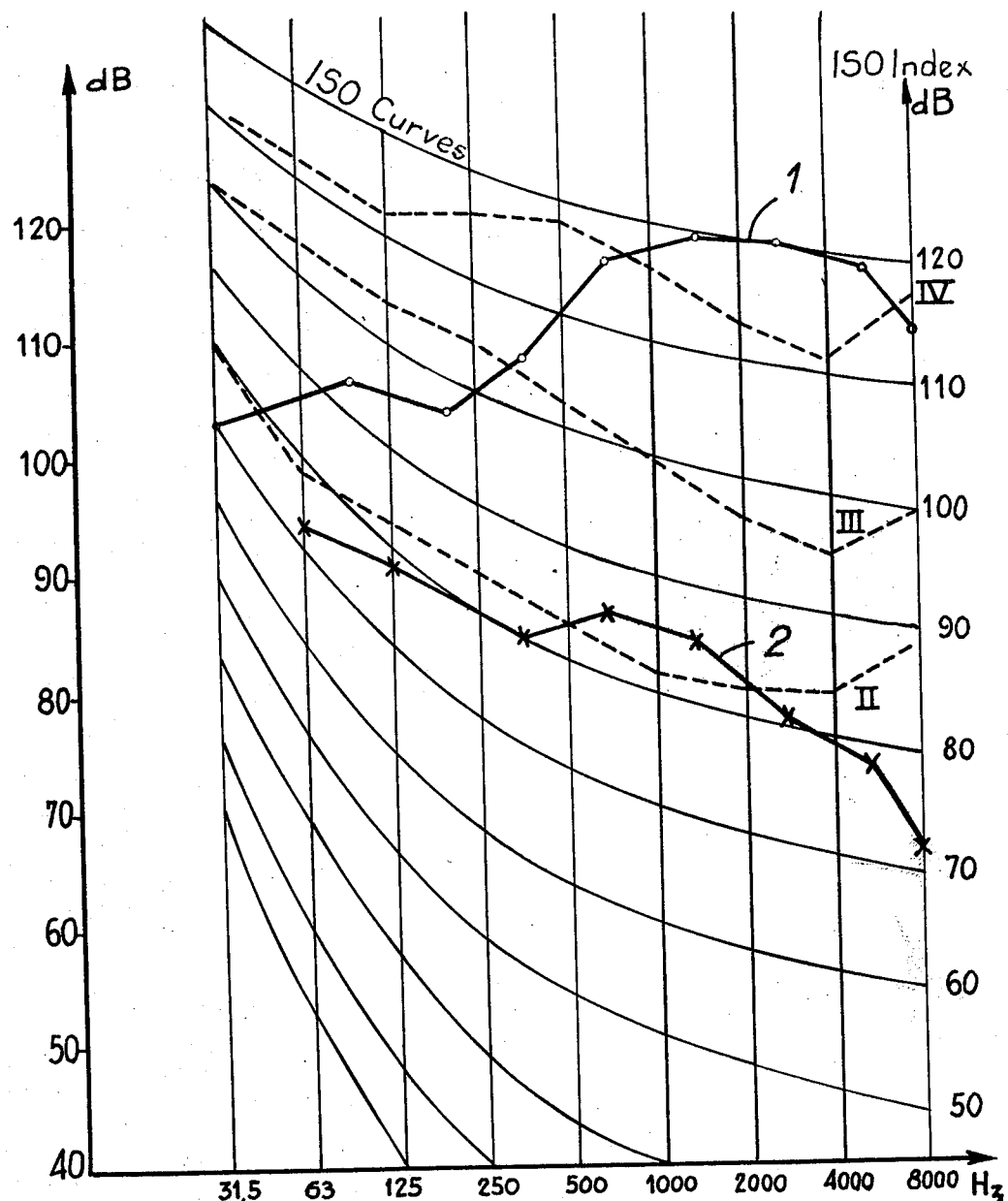
FIG. 1 illustrates Wissner's curves.

The Wissner curves drawn in dash-lines in FIG. 1, in the lattice of so-called "equinuisance" ISO curves, show that :

1. above curve IV, the noise level represents a definite deafness hazard even in the event of only accidental exposure (>110 dB for all frequencies between 35 and 8,000 Hz);

2. between curves III and IV, an exposure time of one hour per day represents a deafness probability ranging from 25% for curve III to 100% for curve IV;

3. between curves II and III, prolonged exposure corresponds to a deafness possibility ranging from 0% for curve II to 100% for curve III; and 4. below curve II, the noise level is not dangerous.

If now the noise level recording obtained with a soundmeter in a riveting area of a workshop for riveting aircraft structures is transferred to the above-defined lattice of curves, then the curve designated I in FIG. 1 shows that from 250 Hz upwards the noise intensity increases considerably and exceeds the danger limit in the region of 1,000 Hz.

In contrast, the application of soundproofing panels according to this invention against the structures to be riveted makes it possible, as will be demonstrated hereinafter, to reduce the noise intensity to an entirely acceptable level, as shown by curve II in FIG. 1.

Figure 2:
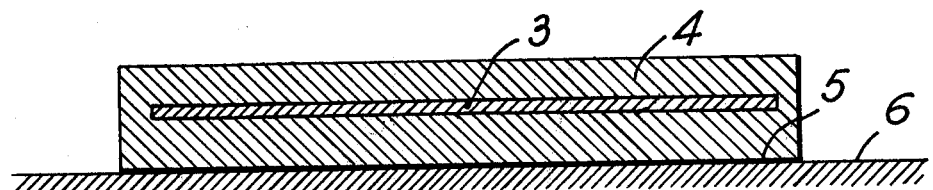
FIG. 2 is a sectional view of a panel according to the invention.

The soundproofing panel shown in FIG. 2 consists of a sheet of lead 3 encased in an elastic material 4, suitable means 5 being used to apply the compound panel against the noise-generating element 6. When sheet 3 is subjected to the effect of the pressure and depression waves from element 6, it begins to vibrate and emits sound waves of the same frequency, and its own transmission factor will depend on the transmission ratio of energy received to energy re-emitted.

Consequently the essential characteristic of sheet 3 will be its noise attenuation factor, and the greater its mass the greater its attenuation factor, whence the "mass law" familiar to acoustic specialists.

Similarly, for any given wall, the noise attenuation factor is greater for high-pitched than for low-pitched frequencies, whence another law known as the "frequency law" and likewise familiar to acoustic specialists.

While it may be advantageous to use a sheet 3 of greatest possible mass, it is necessary to ensure that the sheet can hug the general shape of curved surfaces, whereby, having regard for the density of lead, the thickness must be restricted in accordance with the plot in FIG. 3. In this graph the Y-axis represents an attenuation scale in decibels and the X-axis is represented by two scales, one of which is graduated in $kg/m^2$, the other in Hertz (cycles per second).

Considering for exemplary purposes a sheet of lead 3, 0.6 mm thick and having a mass of 6.4 $kg/m^2$, it may be seen that in accordance with FIG. 3 the noise attenuation at 500 Hz is given as 30 dB by the point 7 on the so-called "mass" curve 9, and that this attenuation will be further modified by the so-called "frequency" law 10 when point 7 has shifted towards point 8.

In this instance, therefore, attenuation rises from 23 dB at 200 Hz to 44 dB at 8,000 Hz, thereby enabling curve 2 to be deduced by subtraction from curve I shown in FIG. 1.

Considering, for example, the 36 dB attenuation at a selected frequency of 2,000 Hz (FIG. 3), reference to curve I (FIG. 1) shows that the 120 dB level will be reduced to 120-36 = 84 dB, as shown by curve 2 in FIG. 1, and that it will thus be possible to define the whole of curve 2.

Manifestly, the thickness chosen in this instance for the sheet 3 will depend only on practical considerations, and any increase in this thickness would result in improved noise attenuation, though obviously to the detriment of sheet flexibility and weight, making it difficult to handle.

The sheet 3 may be a sheet of mild, highly refined lead, encased in a 25 mm thick elastic substance 4 made of an elastomer with a Shore hardness of nearly 55. In accordance with FIG. 2, the panel formed thus is provided with a double-sided adhesive 5 (i.e.: a sheet or strip having contact adhesive surface) or with a self-adhering varnish for convenience of application to the element 6.

In the alternative embodiment shown in FIG. 4, the adhesive means 5 is dispensed with and replaced by ferrite particles 7 dispersed through the plastic material 4, along the edge thereof which is to contact the structure 6, such contact being accordingly effected by magnetic attraction.

Referring lastly to FIG. 5, the soundproofing panel shown thereon is constituted as in FIG. 2 but has associated to it, on its side which is to contact the structure 6, a sheet of plastic 8 bonded to the casing 4 and having ferrite dispersed therethrough. With a thickness of about 1.5 mm, such a flexible magnetic sheet may possess a magnetic application force of approximately 60 g/cm$^2$, which is adequate for most routine applications.

It goes without saying that changes may be made to the forms of embodiment hereinbefore described without departing from the scope of the invention.

What is claimed is:

1. A sound insulating panel for damping the noise of structural members comprising a solid sheet of highly refined soft lead, an envelope of flexible elastomeric material having a shore hardness of about 55 encasing said sheet and means for securing said combined sheet and elastomeric casing in intimate contact with the structural member and for conforming said elastomeric casing to the shape of said structural member.

2. The sound insulating panel according to claim 1 wherein said means for securing said sheet and elastomeric casing comprises an adhesive means disposed on one surface of said casing.

3. The sound insulating panel according to claim 2 wherein said adhesive comprises a sheet of material having a contact adherent on each surface.

4. The sound insulating panel according to claim 2 wherein said adhesive comprises at least one magnet.

5. The soundproofing panel according to claim 4 wherein said magnet comprises particles embedded in said elastomeric material.

6. The soundproofing panel according to claim 1 wherein said lead sheet has a thickness of at least 0.6 mm and said elastomeric casing has a thickness of at least 25 mm.

7. The sound insulating panel according to claim 6 wherein said lead sheet has a mass of at least 6.4 kg/m$^2$.

* * * * *